(12) United States Patent
Rudder et al.

(10) Patent No.: US 7,273,217 B2
(45) Date of Patent: Sep. 25, 2007

(54) REVERSE CASTER PLATFORM

(76) Inventors: Benito V. Rudder, 4181 Mt. Baldy Ct., Norco, CA (US) 92860; Jamal Umar Qattan, 10045 Gaviota Ave., North Hills, CA (US) 91343

( * ) Notice: Subject to any disclaimer, the term of this patent is extended or adjusted under 35 U.S.C. 154(b) by 139 days.

(21) Appl. No.: 10/188,236

(22) Filed: Jul. 2, 2002

(65) Prior Publication Data

US 2004/0004335 A1    Jan. 8, 2004

(51) Int. Cl.
*B60G 7/02* (2006.01)
(52) U.S. Cl. .................................................. 280/86.751
(58) Field of Classification Search ............. 280/86.75, 280/86.751, 5.521, 5.52
See application file for complete search history.

(56) References Cited

U.S. PATENT DOCUMENTS

| | | | |
|---|---|---|---|
| 3,447,813 A | 6/1969 | Wolf | |
| 4,770,430 A | 9/1988 | Lange | |
| 5,015,004 A * | 5/1991 | Mitchell | ..................... 280/81.6 |
| 5,018,756 A * | 5/1991 | Mitchell | ..................... 280/81.6 |
| 5,364,113 A | 11/1994 | Goertzen | |
| 5,474,320 A | 12/1995 | Bojarski et al. | |
| 6,007,078 A * | 12/1999 | Gottschalk et al. | .... 280/86.751 |
| 6,036,217 A | 3/2000 | Burkhart, Sr. et al. | |
| 6,182,984 B1 * | 2/2001 | Chalin | ................... 280/86.751 |
| 6,293,570 B1 * | 9/2001 | Gottschalk et al. | .... 280/86.751 |

\* cited by examiner

*Primary Examiner*—Kurt Rowan
(74) *Attorney, Agent, or Firm*—Walter A. Hackler (57) ABSTRACT

A reverse caster suspension apparatus includes a tiltable platform assembly that is interposed between a sprung axle assembly and a vehicle structure. This arrangement provides an efficient means for changing the caster angle without harmful distortion of springs, and without requiring complex special-purpose suspension design and components that would likely be subjected to excessive wear. The platform assembly includes a platform frame to be connected to the vehicle, a nested, pivotally connected suspension frame to which the axle assembly is attached, and an actuator mechanism coupled at high mechanical advantage between the pivotally connected frames. A pivot axis of the platform assembly can be located approximately in line above respective spindle axes of the axle assembly for facilitating operation of the actuator at low power, and the actuator preferably holds its positive-caster condition with no applied power.

14 Claims, 7 Drawing Sheets

REVERSE CASTER PLATFORM

BACKGROUND

The present invention relates to self-steering axle assemblies for road vehicles, such as may be used for primary and/or auxiliary axle assemblies of commercial vehicles as dictated by loading conditions and highway regulations.

Multiple axle assemblies are typically employed for load distribution on trucks and trailers for hauling heavy loads. In contrast with the simple case of only two axles, one of which is steerable, greater numbers of axles give rise to a need for self-steering to avoid "scrubbing" of tires, unless a positive proportional steering mechanism is utilized. The added cost and specialized nature of such mechanisms makes them prohibitive in many applications, particularly for auxiliary axles that are used only as dictated by loading conditions. Consequently, various self-steering axle configurations have been developed, such as are disclosed in U.S. Pat. Nos. 4,770,430 to Lange, and 5,364,113 to Goertzen. These devices utilize positive caster angles for self-steering during forward movement, and shift to negative caster angles during reverse or backing movements. In related developments, reverse-caster mechanisms have been applied to towed vehicles (trailers), as disclosed for example in U.S. Pat. Nos. 3,447,813 to Wolf, 5,474,320 to Bojarski et al., and 6,036,217 to Burkart, Sr., et al. A first embodiment disclosed in the Wolf reference uses a mechanism to distort oppositely disposed load-carrying leaf springs between respective positive and negative camber orientations of an axle beam that is clamped to the springs at medial locations thereof. A disadvantage of this arrangement is the extra and potentially damaging strain to which the springs are subjected. Another disadvantage is that excessive force is required to effect the shifting between camber angles in that the stiffness of the springs must be overcome by the mechanism.

In other embodiments of the Wolf device (and as disclosed in the other references), a separate pivoting element is added to the suspension itself to permit shifting between positive and negative caster. These devices of the prior art are also not entirely satisfactory, typically exhibiting one or more of the following disadvantages:

1. They incorporate excessive amounts of "unsprung weight" that compromises performance on rough roads;

2. They are expensive to provide in that the separate pivoting elements have to be fitted into tight spaces and require elaborate and precise machining operations;

3. They are incompatible in many cases with standard suspension designs and existing parts inventories; and 4. They contribute to vehicle instability in that they add objectionable height to the suspension arrangement.

Further, the Lange reference exhibits a disadvantage of the above-referenced first embodiment of the Wolf device, in that it incorporates air-springs that must be deflected laterally and angularly during camber shifts. This restricts the effective travel range of the suspension and/or contributes to premature failure of the air springs. Moreover, another embodiment of the Wolf device requires the ride height of the suspension itself to be changed in order to effect camber changes. This is particularly impractical in commercial freight-hauling vehicles, both in regard to the energy expended in raising and lowering loads, and the added difficulties associated with operations at loading docks.

Thus there is a need for a self-steering axle unit that operates without excessive or abnormal spring deflection, that is light in unsprung weight, that is versatile in being compatible with conventional suspension configurations, and that otherwise overcomes the disadvantages of the prior art.

SUMMARY

The present invention meets this need by providing a reversible self steering vehicle axle arrangement that is particularly versatile and effective in that it can incorporate conventional axle configurations, and it is easy to install as an accessory of existing vehicles. In one aspect of the invention, a bidirectional self-steering axle apparatus includes a load-carrying platform having a generally horizontal load-carrying orientation; a frame pivotally mounted to the platform on a transverse main pivot axis; a locating structure on the frame for connecting means for locating oppositely disposed spindles of an axle assembly relative to the frame; a biasing connection on the frame for connecting means for biasing against downward movement of the frame relative to the spindles of the axle assembly; and an actuator for pivoting the frame about the transverse axis, the actuator being operable for positioning the frame in respective first and second positions relative to the platform, the first and second positions corresponding to different caster angles of the axle assembly. The locating structure can include respective laterally disposed pivot flange members of the frame having transverse openings therethrough for receiving corresponding pivot pins, the biasing connection including laterally disposed shackle flange members of the frame for receiving corresponding shackle pins, corresponding ones of the pivot and shackle flange members being longitudinally disposed oppositely relative to the main pivot axis.

The platform apparatus can further include the axle assembly itself, locating means of the axle assembly being connected to the locating structure, and biasing means connected between the axle assembly and the biasing connection, wherein the first and second caster angles correspond to oppositely signed caster angles of the axle assembly when the platform is in the load carrying orientation. The axle assembly can further include an axle beam having spindle members extending from opposite ends thereof. The spindle members can be pivotally connected to the axle beam on coplanar spindle pivot axes, the plane of the spindle pivot axes defining the caster angle, the spindle members being also movably connected by a tie member for unison steerage thereof relative to the axle beam, the locating means and the biasing means being connected between the frame and the axle beam.

The biasing means can include a laterally spaced pair of leaf spring units, one end of each leaf spring unit being pivotally connected to the locating structure of frame in longitudinal relation to the main pivot axis, the opposite end of each spring unit being linked to the biasing connection of the frame in longitudinally opposite relation to the main pivot axis, the axle beam being rigidly mounted at medial locations along the spring units, whereby the locating means includes the pivotal connections of the spring units to the platform and the rigid mounting of the axle beam to the spring units. The axle assembly can further include respective load-carrying wheels rotatably mounted on the spindle members.

In another aspect of the invention, a reverse caster platform apparatus includes the load-carrying platform having a generally horizontal load-carrying orientation; the frame pivotally mounted to the platform on a transverse axis; an axle assembly fixably located relative to the frame, the axle assembly including transversely oppositely disposed spindle members, locating means for locating the spindle members in a vertically extending path relative to the frame, biasing means for resisting downward movement of the frame relative to the spindle members, the spindle members being steerably movable relative to the frame; and the actuator for pivoting the frame about the transverse axis, the actuator being operable for positioning the frame in respective first and second positions relative to the platform, the first and second positions corresponding to respective oppositely signed caster angles of the axle assembly when the platform is in the load carrying orientation.

The axle assembly can include the axle beam having the oppositely extending spindle members that can be pivotally connected to the axle beam on the coplanar spindle pivot axes, the tie member movably connecting the spindle members for unison steerage, the locating means and the biasing means being connected between the frame and the axle beam. The biasing means can include the laterally spaced leaf spring units to which the axle beam is mounted, one end of each leaf spring unit being pivotally connected to the frame in longitudinal relation to the axle assembly to provide the locating means, the opposite end of each spring unit being linked to the frame in longitudinally opposite relation to the axle assembly.

A alternate configuration of axle assembly can include first and second torsion arm members, each of the torsion arm members being rigidly connected in generally radial relation to corresponding first and second torsion bars, the torsion bars being journaled proximate the torsion arms to respective transversely spaced locations relative to the frame, respective distal extremities of the torsion bars being anchored relative to the frame, distal extremities of the torsion arm members being connected for providing the biasing means. The locating means can include the spindle members being connected to respective ones of the torsion arms in a manner defining the caster angles of the axle assembly. The spindle members can have pivotal connections on respective spindle axes, the spindle axes being generally coplanar when the torsion bars have symmetrical deflection, the plane of the spindle axes defining the caster angle, the spindle members being also movably connected by a tie member for unison steerage thereof relative to the frame.

The biasing means can include a spring element of the axle assembly. The locating means can include structure of the spring element.

The locating means can include an arm member of the axle assembly. The axle assembly can further include respective spindle support members pivotally connected to the spindle members, arm member being one of a corresponding pair of arm members having pivotal connections to the spindle support members. The axle assembly can further include respective load-carrying wheels rotatably mounted on the spindle members.

DRAWINGS

These and other features, aspects, and advantages of the present invention will become better understood with reference to the following description, appended claims, and accompanying drawings, where:

DESCRIPTION

Figures 1, 2:
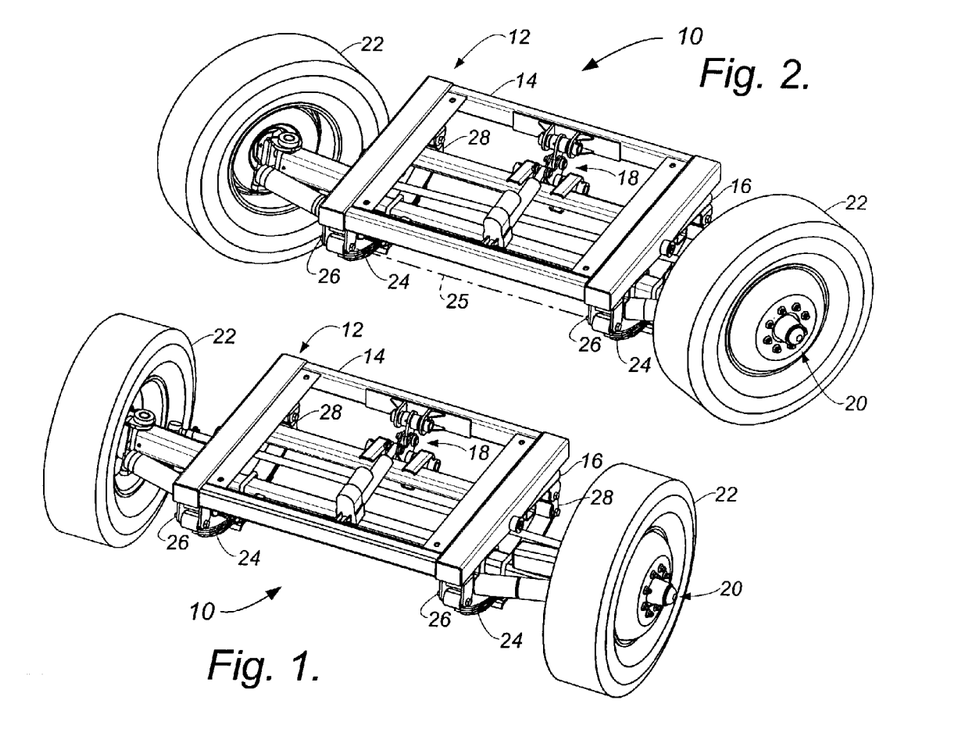
FIG. 1 is a perspective view of a self-steering axle unit according to the present invention, load-supporting wheels of the axle unit being in a neutral steering orientation.
FIG. 2 is a perspective view as in FIG. 1, but with the wheels in an off-center steering orientation.
Figure 3:
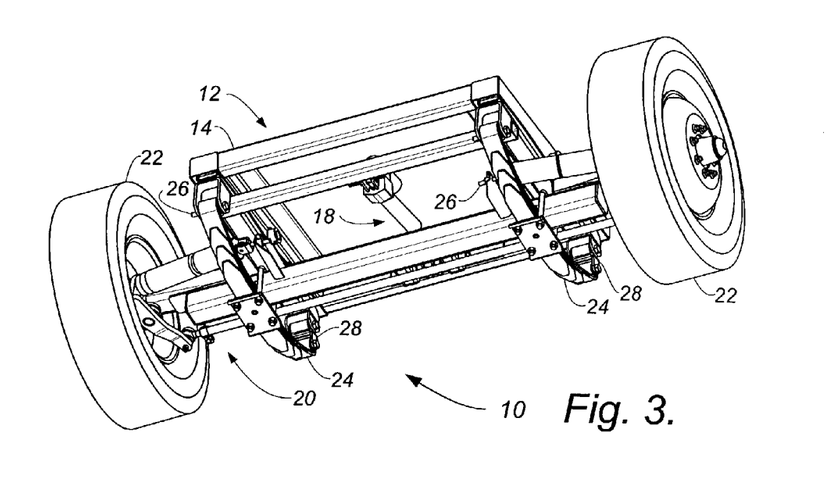
FIG. 3 is a bottom perspective view of the self-steering axle unit of FIG. 1.
Figures 4, 5, 6:
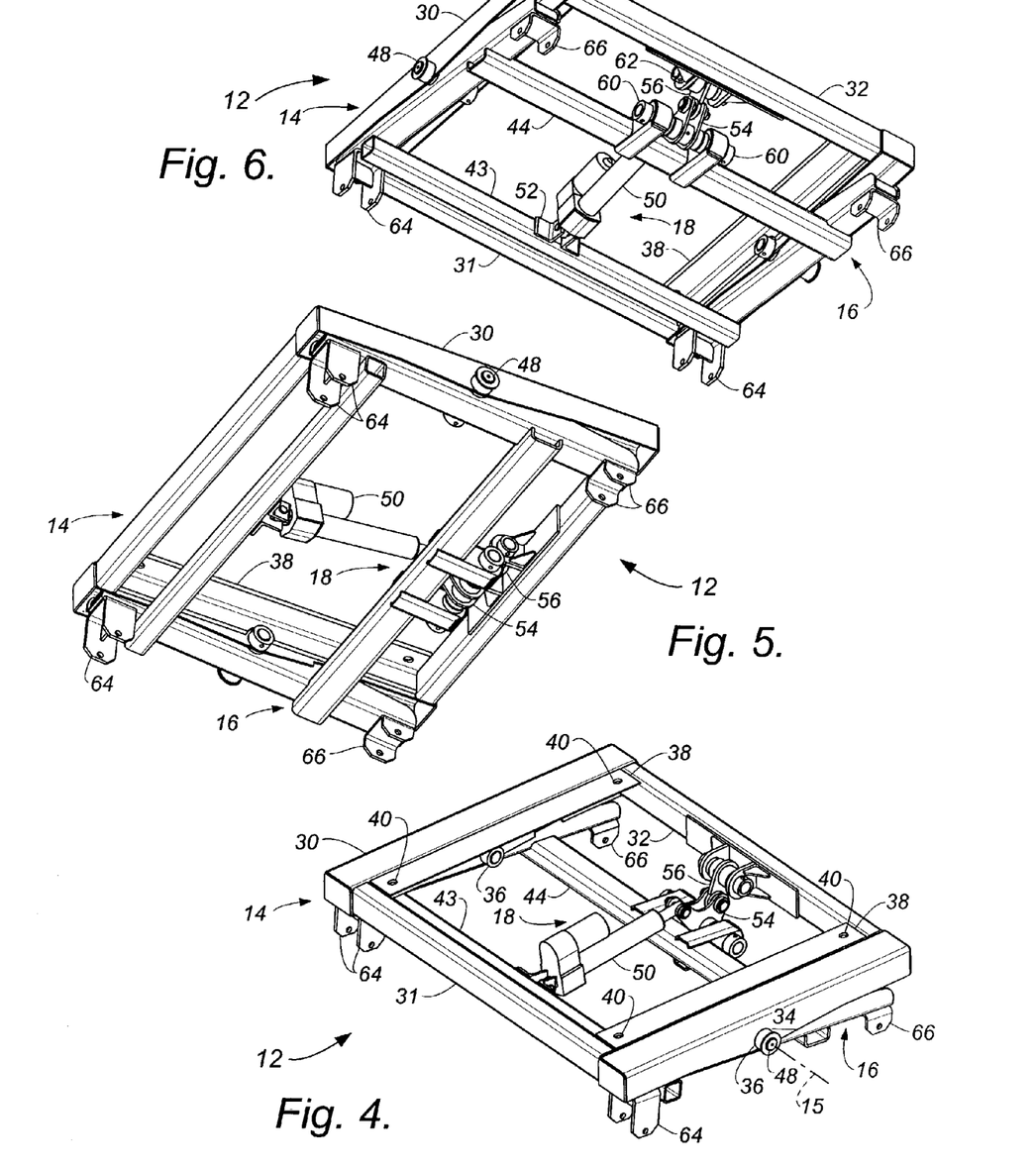
FIG. 4 is a perspective view of a platform assembly portion of the axle unit of FIG. 1.
FIG. 5 is a bottom perspective view of the platform assembly of FIG. 4.
FIG. 6 is a bottom rear perspective view of the platform assembly of FIG. 4.
Figure 7:
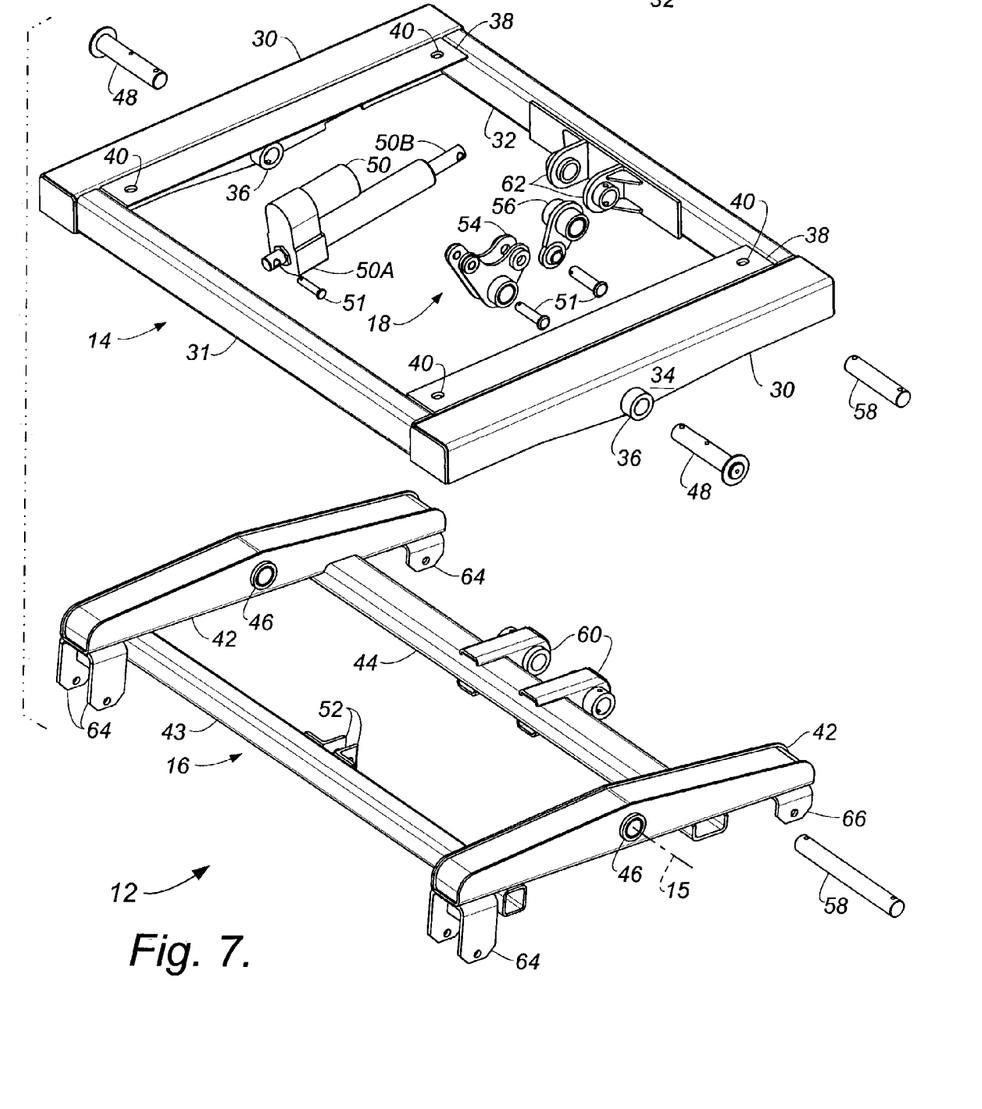
FIG. 7 is an exploded view of the platform assembly of FIG. 4.
Figure 8:
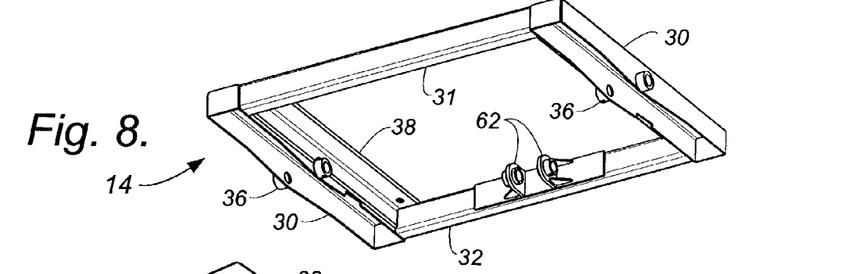
FIG. 8 is a bottom perspective view as in FIG. 5, showing a load-carrying platform portion of the platform assembly of FIG. 4.
Figure 9:
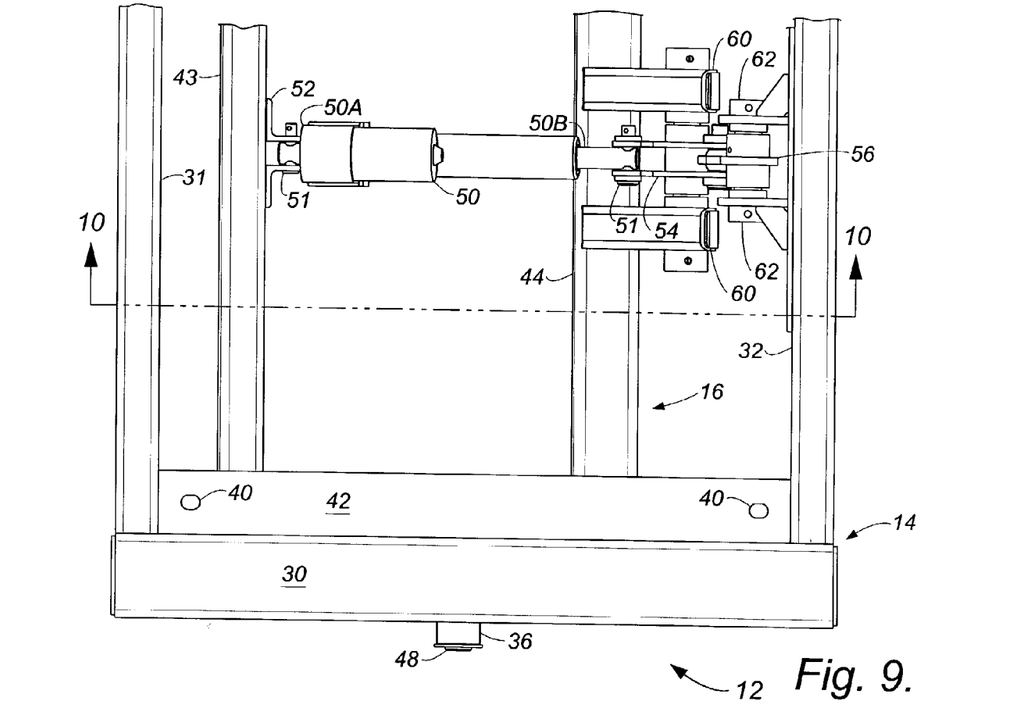
FIG. 9 is a plan view of a portion of the platform assembly of FIG. 4.

The present invention is directed to a self-steering axle unit that is particularly versatile and effective for distributing heavy loads of road vehicles while avoiding tire scrubbing in both forward and reverse vehicle movements. With reference to FIGS. 1-13 of the drawings, an axle unit 10 according to the present invention includes a tilting platform assembly 12 that incorporates a load-carrying platform 14 that is pivotally connected on a transverse pivot axis 15 to a tiltable suspension frame 16 and an actuator mechanism 18 mechanically coupled between the platform and the frame for tilting same with respect to a generally horizontal orientation of the platform 14, the frame 16 being adapted for mounting an axle assembly 20 having a transversely oppositely disposed pair of load-carrying wheels 22. The wheels 22 are self-steering as shown in FIG. 2 and described below, an exemplary configuration of the axle assembly 20 having a pair of transversely spaced leaf spring units 24 that are pivotally connected to the frame 16 on a spring pivot axis 25 by respective pin members 26, the spring units 24 also being shackled to the frame 16 by respective shackle assemblies 28 in FIGS. 1-3.

The platform assembly 12, which is more clearly shown in FIGS. 4-11, is adapted for mounting to the underside of a vehicle (not shown) as described herein. The platform frame 14 includes an oppositely disposed pair of inverted channel members 30 that are rigidly connected by respective first and second cross members 31 and 32, opposite depending flange portions 34 of each channel member having respective main journal members 36 installed therein on the pivot axis 15. The platform frame also has a pair of angle members 38 that are located flush with the top surfaces of the channel members 30 and projecting inwardly therefrom, each of the angle members 38 having a pair of mounting holes 40 formed therein for attachment to the vehicle. Other suitable configurations and means for attachment of the platform assembly 12 are contemplated, such as by welding.

Figure 10:
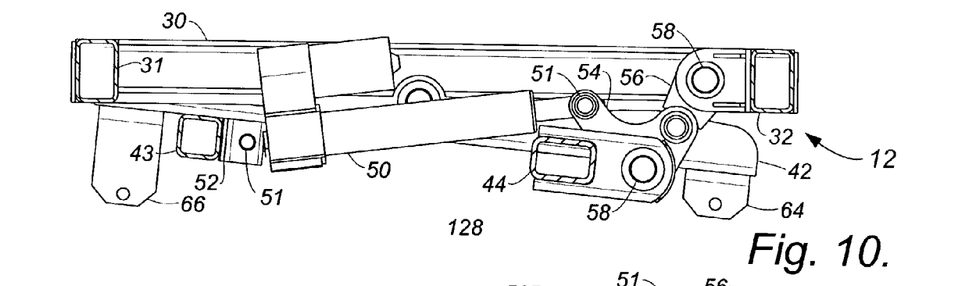
FIG. 10 is a lateral sectional view on line 10-10 of FIG. 9, the platform assembly being in a normal, positive-caster configuration.
Figure 11:
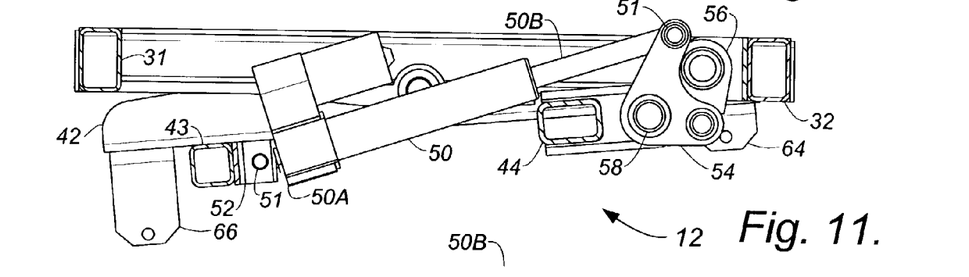
FIG. 11 is a sectional view as in FIG. 10, showing the platform assembly shifted into a negative-caster configuration
Figure 12:
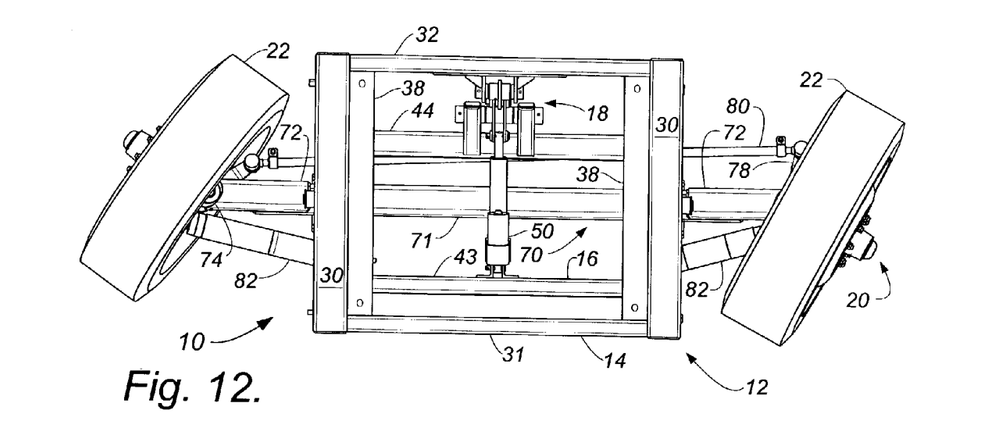
FIG. 12 is a plan view of the of the axle unit of FIG. 2.

As further shown in FIGS. 4-11, the suspension frame 16 has a laterally spaced pair of side frame members 42 that are rigidly connected by respective third and fourth cross members 43 and 44, the side frame members being weldments of tapered and boxed configuration, incorporating respective journal sleeves 46 for receiving corresponding main pivot pins 48 that also engage the journal members 36 of the platform frame 14. The actuator mechanism 18 includes a linear actuator unit 50 having a housing end 50A thereof pivotally connected by an clevis pin 51 to a pair of anchor brackets 52, the anchor brackets being fastened by suitable means such as welding to the third cross member of the suspension frame 16. An actuator rod 50B of the actuator unit 50 is coupled by further clevis pins 51 through a lever member 54 to a link 56, the lever being pivotally located relative to the fourth cross member 44 of the suspension frame 16 by an anchor pin 58, the link likewise being pivotally anchored relative to the second cross member of the platform frame 14 by a counterpart of the anchor pin 58. More particularly, a pair of suspension journal members 60 are rigidly attached to the fourth cross member 44 of the suspension frame 16 and in projecting relation thereto for receiving the anchor pin 58 for the lever member 54, and a pair of platform journal members 62 are similarly attached (by suitable means such as welding) to the second cross member 32 of the platform frame 14 for receiving the anchor pin 58 of the link 56. As best shown in FIGS. 10 and 11, the arrangement of the actuator mechanism 18 is such that operation of the actuator unit 50 effects tilting of the suspension frame 16 at high mechanical advantage relative to the platform frame 14 between a first position shown in FIG. 10 and a second position shown in FIG. 11. Preferably the actuator unit 50 assumes a retracted condition in the first position, with the clevis pin 51 connecting the lever member 54 to the link 56 being approximately in-line between the anchor pins 58, the first position of the suspension frame being normally such that a positive caster condition of the axle assembly 20 is obtained, for enabling the axle unit 10 to maintain the positive caster condition during extended intervals of forward vehicle operation with little (if any) required power consumption, and with the actuator unit 50 being in a retracted condition, the surfaces of the actuator rod 50B that are exposed in the second position being protected from the elements in the first position of the suspension frame.

Controlled activation of the actuator unit 50 can be easily accomplished my methods well within the ordinary skill in the art. For example, control electronics configured for responding to a vehicle "back-up" light switch can power the actuator for movement of the platform unit 12 to its second or reverse-caster position when a reverse gear of the vehicle is selected. A suitable limit-switch can be used for cutting or reducing power to the actuator 50 when the second position is obtained, depending on whether the actuator 50 is configured for holding the second position under load without power. When the reverse gear is no longer selected, the control electronics can automatically power the actuator 50 in the opposite direction until a second limit switch is activated in the first position of the platform unit 12. As is also well known regarding motor-driven actuators, the actuator 50 can incorporate a slip-clutch or other torque-limiting device in place of the first limit switch. Also, other actuator types, such as hydraulic, pneumatic, and mechanical (such as by a hand-operated lever), can also be used.

The range of caster angle change between the first and second positions of the suspension frame can depend on the specific application. Typically preferred actual caster angles are 5 degrees positive during forward movement and 5 degrees negative during reverse movement, with other angles such as between 3 and 11 degrees being also contemplated. In this respect, consideration is also given to variations in caster angle with loading (ride height) that is characteristic of some suspension configurations.

As indicated above, the present invention advantageously permits axle assembly 20 is mounted as a unit to the suspension frame 16. In the exemplary configuration of FIGS. 1-13, the suspension frame 16 has pairs of pivot mount flanges 64 rigidly depending from proximate an end extremity of each side frame member 42 for receiving the pin members 26 by which the spring units 24 of the axle assembly 20 are pivotally connected. Likewise, respective pairs of shackle mount flanges 66 rigidly depend from proximate opposite end extremities of the side frame members 42, the flanges 66 being adapted for receiving counterparts of the pin members 26 of the shackle assemblies 28.

Figure 13:
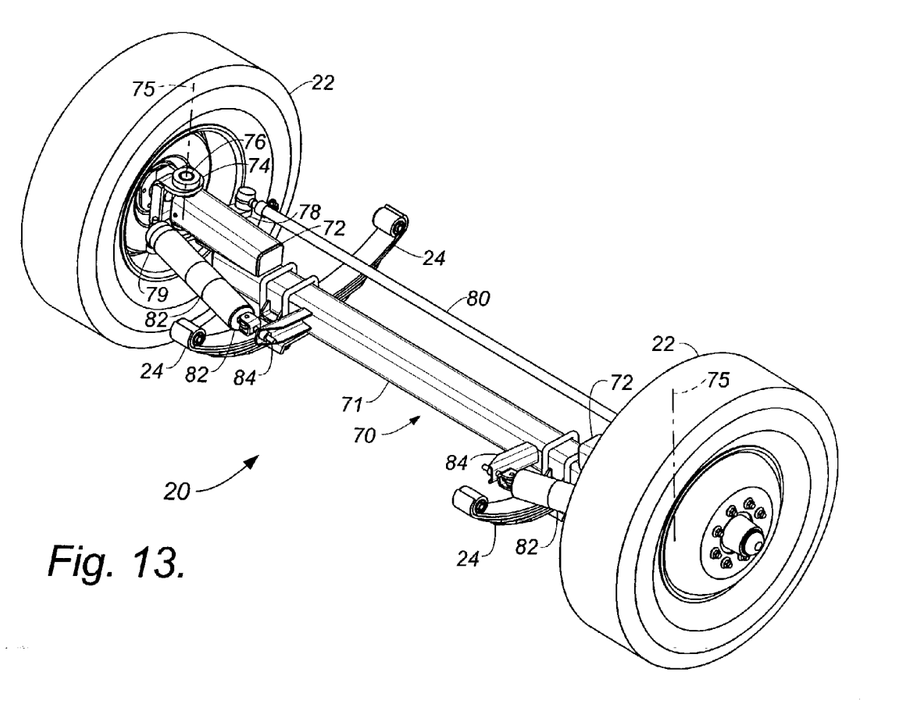
FIG. 13 is a perspective view of an axle assembly portion of the axle unit of FIG. 1.

As best shown in FIG. 13, the exemplary axle assembly 20 further includes main axle beam 70 having an elongate main beam member 71 to which the spring units 24 are clamped in a conventional manner, and oppositely outwardly and slightly upwardly projecting spindle mounts 72 that are rigidly attached to the main beam member 71 by suitable means such as welding. A symmetrical pair of spindle members 74 that are rotatably supported by the wheels 22 are pivotally connected to the spindle mounts 72 on respective king pin axes 75 by respective co-planar king pins 76, each spindle member 74 having oppositely and laterally inwardly projecting arms, designated steering arm 78 and stabilizer arm 79, respectively. A tie rod 80 pivotally connects the steering arms 78 proximate respective end extremities thereof for unison steering of the wheels 22 in a conventional manner. A pair of tubular dampers 82 are pivotally connected to respective ones the stabilizer arms 79, each damper 82 being anchored to the axle beam 70 by being pivotally connected to a shock mount 84 that rigidly projects from the main beam member 71.

With further reference to FIGS. 14-18, an alternative configuration of the axle unit, designated 10', has another exemplary axle assembly, designated torsion-arm axle assembly 20'. In this configuration, a counterpart of the platform assembly, designated 12', has a counterpart of the suspension frame, designated 16', that does not include the pivot flanges 64 or the shackle flanges 66 of the above-described suspension frame 16, because the torsion-arm axle assembly is internally sprung instead of including the pivotally connected spring units 24. More particularly, the torsion arm axle assembly 20' has a counterpart of the axle beam, designated 70', that is mounted directly to the suspension frame 16'. Accordingly, the axle beam 70' includes a laterally oriented tubular beam member 71' and a laterally spaced pair of longitudinal bracket members 86 that are fixedly attached thereto by suitable means such as welding, the bracket members 86 each having a pair of mounting holes 88 formed therethrough for fastening to the undersides of the side frame members 42 of the suspension frame, 16'.

Figures 14, 15, 16:
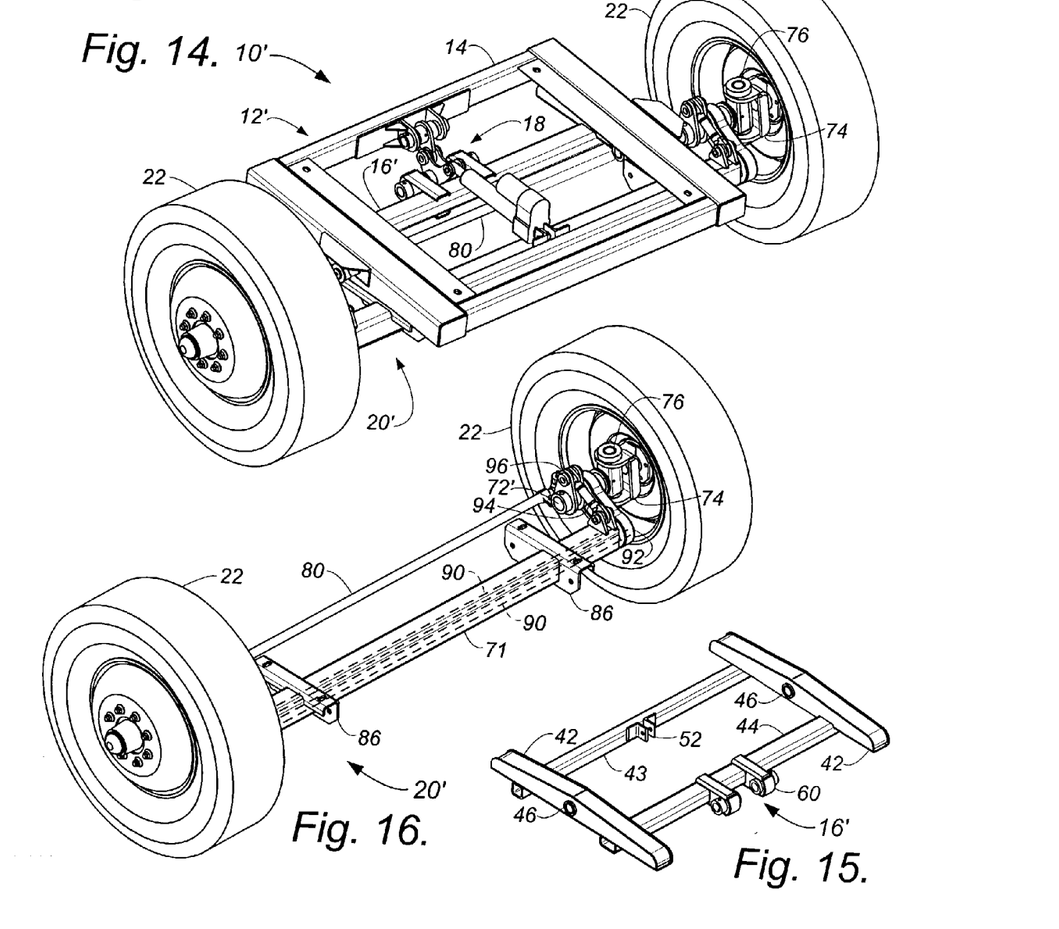
FIG. 14 is a perspective view showing an alternative configuration of the axle unit of FIG. 1.
FIG. 15 is a perspective view showing a movable frame portion of the axle unit of FIG. 14.
FIG. 16 is a perspective view of an axle assembly portion of the axle unit of FIG. 14.
Figure 17:
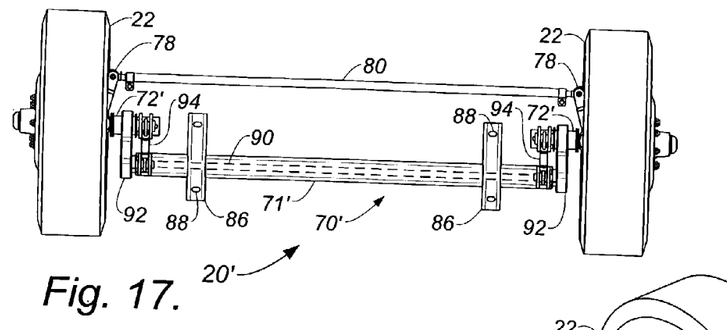
FIG. 17 is a plan view of the axle assembly of FIG. 16.
Figure 18:
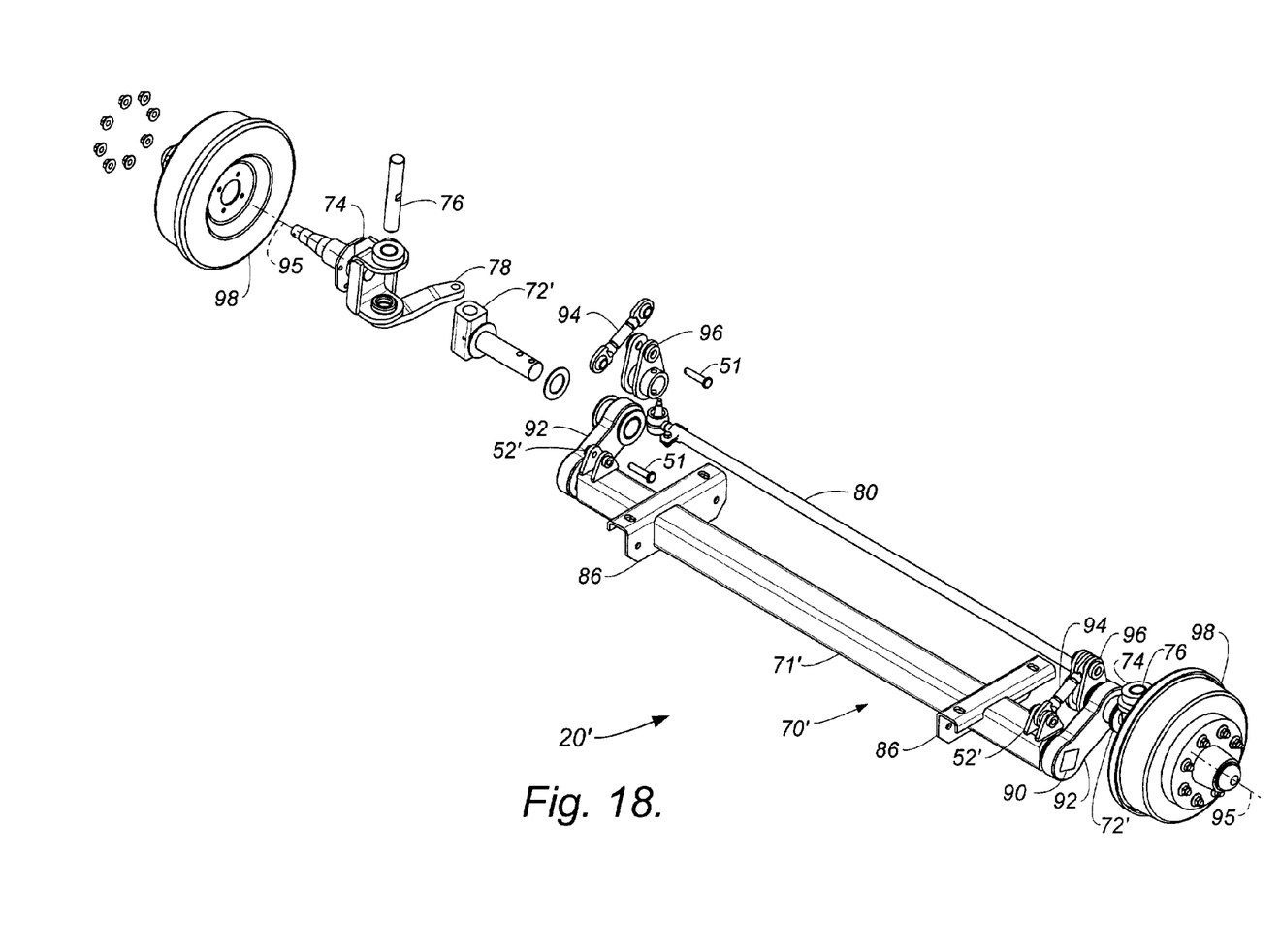
FIG. 18 is an exploded view of the axle assembly of FIG. 16.

The torsion-arm axle assembly 20' also includes a pair of torsion bars 90 within the main beam member 71', each of the bars 90 being journaled at one end of the beam 71' and clamped or otherwise fixedly engaged proximate the other end. The journaled ends of the bars 90 project from opposite ends of the beam 71', being rigidly coupled to respective arm members 92 as shown in FIGS. 16 and 18. The longitudinally projecting extremities of the arm members 92 are journaled for rotatably engaging counterparts of the spindle mounts, designated 72' in FIG. 18, that are pivotally connected to counterparts of the spindle members 74 thereto by counterparts of the king pins 76. Also, a pair of adjustable link assemblies 94 are coupled between the main beam member 71' and the arm members 92 for maintaining a desired caster angle component of the king pins 76 relative to the axle beam 70', the overall caster angle being between positive and negative values as described above in relation to the first and second positions of the suspension frame 42. More particularly, (stronger) counterparts of the anchor bracket, designated 52', project upwardly from proximate opposite ends of the main beam member 71', and a crank member 96 is fixedly coupled to each of the spindle mounts 72', the adjustable link assembly 94 being coupled therebetween by counterparts of the clevis pins 51. Also shown in FIG. 18 are a pair of brake assemblies, rotatably mounted to the spindle members 74 on respective spindle axes 95, the brake assemblies 98 being adapted for mounting the wheels 22 in a conventional manner. In a preferred exemplary configuration, the effective length of the link assemblies 94 is the same as that of the arm members 92 for maintaining a constant caster angle relative to the beam assembly 70', and further, that this condition coincide with adjustment of the link assemblies to a zero caster angle relative to the beam assembly. It will be understood that some variation in the caster angle relative to the suspension frame is allowable, provided that the actuator mechanism 18 has sufficient travel for moving the axle assembly between positive and negative caster angles under appropriate vehicle operating conditions.

As described above, the present invention provides an efficient means for changing the caster angle without harmful distortion of springs, and without requiring complex special-purpose suspension design and components that would likely be subjected to excessive wear. The platform assembly 12 (or 12') has the pivot axis 15 located approximately in line above respective spindle axes of the axle assembly 20 (or 20') for facilitating operation of the actuator at low power. The main pivot axis can be located such that actuation between the first and second positions of the platform assembly 12 causes the spindles to move between slightly behind and slightly ahead of the spindle axes, for balancing the forces required by the mechanism in both directions of movement, and for maintaining a nearly constant height of the platform frame 14 between the positive and negative caster conditions for a given loading of the vehicle.

Also, the actuator 50 preferably holds the positive-caster condition with no applied power, based on a typical amount of internal friction. This is because the clevis pin 51 that couples the lever member 54 to the link 56 is approximately aligned between the anchor pins 58 in the positive caster condition of preferred implementations. This is an important advantage, particularly under heavy braking during forward motion, in that braking force reactions would otherwise apply a heavy tension load on the actuator 50. In normal backing maneuvers, heavy braking is not generally encountered, particularly in that low speeds and mild grades are generally involved. In this respect, the loading of the actuator 50 under braking in the reverse caster condition of the platform assembly 12 is sufficiently low to be tolerated by conventional actuators that are otherwise suitable for powering the actuator mechanism 18.

As described above, the axle unit 10 can be advantageously employed as a "pusher axle" ahead of main rear-drive axle or axles of a truck or other cargo vehicle, a "tag axle" behind the drive axle and, when equipped with a drawbar, the axle unit 10 can support the front of a trailer for removing tongue load from the towing vehicle. The application supporting the front of a trailer has the added advantages of increased lateral stability, and increased clearance over ramps and uneven roadways.

Although the present invention has been described in considerable detail with reference to certain preferred versions thereof, other versions are possible. For example, other types of axle assemblies than those described above are contemplated, such as rubber ride and coil spring types of torsion axles, and those having swinging axles as well as various types of parallel, non-parallel, equal-length and non-equal-length arms, and even wagon-style steering axles. Therefore, the spirit and scope of the appended claims should not necessarily be limited to the description of the preferred versions contained herein.

What is claimed is:

1. Reverse caster platform apparatus comprising:
   (a) a load-carrying platform having a generally horizontal load-carrying orientation;
   (b) a frame pivotally mounted to the platform on a transverse main pivot axis;
   (c) pivot flange portions laterally disposed on the frame for receiving pivot pins;
   (d) an axle assembly having an axle beam with spindle member extending from opposite sides thereof, the spindle member being pivotally connected to the axle beam on coplanar spindle pivot axes, the plane of the spindle pivot axes defining caster angles, the spindle members being also movably connected by a tie member for unison steerage thereof relative to the axle beam, the pivot flange portion and the springs being connected between the frame and the axle beam;
   (e) springs disposed on the frame for for biasing against downward movement of the frame relative to spindles of the axle assembly, the springs comprising laterally disposed shackle flange members on the frame for receiving corresponding shackle pins; and
   (f) an actuator for pivoting the frame about the transverse axis, the actuator being operable for positioning the frame in respective first and second positions relative to the platform, the first and second positions corresponding to different caster angles of the axle assembly.

2. The platform apparatus of claim 1, wherein the spring comprise a laterally spaced pair of leaf spring units, one end of each leaf spring unit being pivotally connected to the pivot flange portion of frame in longitudinal relation to the main pivot axis, the opposite end of each spring unit being linked to the frame in longitudinally opposite relation to the main pivot axis, the axle beam being rigidly mounted at medial locations along the spring units.

3. The platform apparatus of claim 1 the axle assembly further comprising respective load-carrying wheels rotatably mounted on the spindle members.

4. A reverse caster platform apparatus comprising:
   (a) a load-carrying platform having a generally horizontal load-carrying orientation;
   (b) a frame pivotally mounted to the platform on a transverse axis;
   (c) an axle assembly fixably located relative to the frame, the axle assembly comprising transversely oppositely disposed spindle members, locating means for locating the spindle members in a vertically extending path relative to the frame, biasing means for resisting downward movement of the frame relative to the spindle members, the spindle members being steerably movable relative to the frame, said axle assembly including an axle beam having spindle members extending from opposite ends thereof, said spindle members being pivotally connected to the axle beam on coplanar spindle pivot axes, the plane of the spindle pivot axes defining the caster angle, the spindle members being also movably connected by a tie member for unison steerage thereof relative to the axle beam, the locating means and the biasing means being connected between the frame and the axle beam; and (d) an actuator for pivoting the frame about the transverse axis, the actuator being operable for positioning the frame in respective first and second positions relative to the platform, the first and second positions corresponding to respective oppositely signed caster angles of the axle assembly when the platform is in the load carrying orientation.

5. The platform apparatus of claim 4 wherein the biasing means comprises a laterally spaced pair of leaf spring units, one end of each leaf spring unit being pivotally connected to the frame in longitudinal relation to the axle assembly, the opposite end of each spring unit being linked to the frame in longitudinally opposite relation to the axle assembly, the axle beam being rigidly mounted at medial locations along the spring units, whereby the locating means comprises the pivotal connections of the spring units to the platform and the rigid mounting of the axle beam to the spring units.

6. The platform apparatus of claim 4, wherein the axle assembly comprises first and second torsion arm members, each of the torsion arm members being rigidly connected in generally radial relation to corresponding first and second torsion bars, the torsion bars being journaled proximate the torsion arms to respective transversely spaced locations relative to the frame, respective distal extremities of the torsion bars being anchored relative to the frame, distal extremities of the torsion arm members being connected for providing the biasing means.

7. The platform apparatus of claim 6, wherein the locating means comprises the spindle members being connected to respective ones of the torsion arms in a manner defining the caster angles of the axle assembly.

8. The platform apparatus of claim 7, wherein the spindle members have pivotal connections on respective spindle axes, the spindle axes being generally coplanar when the torsion bars have symmetrical deflection, the plane of the spindle axes defining the caster angle, the spindle members being also movably connected by a tie member for unison steerage thereof relative to the frame.

9. The platform apparatus of claim 4, wherein the biasing means comprises a spring element of the axle assembly.

10. The platform apparatus of claim 9, wherein the locating means comprises structure of the spring element.

11. The platform apparatus of claim 4, wherein the locating means comprises an arm member of the axle assembly.

12. The platform apparatus of claim 11, wherein the axle assembly further comprises respective spindle support members pivotally connected to the spindle members, arm member being one of a corresponding pair of arm members having pivotal connections to the spindle support members.

13. The platform apparatus of claim 4, the axle assembly further comprising respective load-carrying wheels rotatably mounted on the spindle members.

14. A reverse caster platform apparatus, comprising:
(a) a load-carrying platform having a generally horizontal load-carrying orientation;
(b) a frame pivotally mounted to the platform on a transverse main pivot axis;
(c) a locating structure on the frame, comprising respective laterally disposed pivot flange members, and laterally disposed shackle flange members, corresponding ones of the pivot and shackle flange members being longitudinally disposed oppositely relative to the main pivot axis;
(d) a pair of leaf spring units, one end of each leaf spring unit being pivotally connected to a respective one the pivot flange members and shackled to a corresponding one of the shackle flange members;
(e) an axle assembly mounted between medial locations along the leaf spring units, the axle assembly comprising an axle beam having spindle members pivotally connected at opposite ends thereof on coplanar spindle axes, the plane of the spindle pivot axes defining a caster angle, the spindle members also being movably connected by a tie member for unison steerage, and load carrying wheels rotatably mounted on the spindle members,, the leaf spring units biasing against downward movement of the frame relative to the spindles of the axle assembly; and
(f) an actuator for pivoting the frame about the transverse axis, the actuator being operable for positioning the frame in respective first and second positions relative to the platform, the first and second positions corresponding to oppositely signed caster angles of the axle assembly when the platform is in the load carrying orientation.

* * * * *